US009942336B2

(12) United States Patent
Bostick et al.

(10) Patent No.: US 9,942,336 B2
(45) Date of Patent: Apr. 10, 2018

(54) TIME AND TASK BASED VALIDATION TO ENABLE OR DISABLE PARENTAL CONTROLS

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 186 days.

(21) Appl. No.: 14/704,499

(22) Filed: May 5, 2015

(65) Prior Publication Data
US 2016/0330078 A1   Nov. 10, 2016

(51) Int. Cl.
*G06F 15/173* (2006.01)
*H04L 29/08* (2006.01)
(Continued)

(52) U.S. Cl.
CPC .......... *H04L 67/22* (2013.01); *G06F 21/6263* (2013.01); *H04L 29/08936* (2013.01);
(Continued)

(58) Field of Classification Search
CPC ....... H04L 51/12; H04L 67/22; H04L 67/306; H04L 63/12; G06F 2221/2141; G06F 2221/2137; G06F 11/3438; H04N 21/4751
(Continued)

(56) References Cited

U.S. PATENT DOCUMENTS 8,010,037 B2   8/2011 Bannwolf et al.
8,077,016 B2   12/2011 Cohen
(Continued)

FOREIGN PATENT DOCUMENTS

WO   2013016663   4/2013

OTHER PUBLICATIONS

List of IBM Patents or Patent Applications Treated as Related, 1 page.
(Continued)

*Primary Examiner* — Wing F Chan
*Assistant Examiner* — Andrew Woo
(74) *Attorney, Agent, or Firm* — Lisa Ulrich; Andrew M. Calderon; Roberts Mlotkowski Safran Cole & Calderon, P.C.

(57) ABSTRACT

Approaches are provided for to enabling or disabling parental controls based on time or task validation using a centralized computing environment. An approach includes receiving parental control rules for one or more computing devices. The approach further includes publishing the parental control rules to each of the one or more computing devices to enable the parental control rules on each of the one or more computing devices. The approach further includes determining whether at least one of completion of a task is validated, and the current time is outside of a specified time. The approach further includes at least one of when the completion of the task is validated, and the current time is outside of the specified time period, publishing a parental control disable command to each of the one or more computing devices to disable at least one of the parental control rules.

13 Claims, 7 Drawing Sheets

(51) Int. Cl.
- *H04W 4/20* (2018.01)
- *H04L 29/06* (2006.01)
- *H04W 12/08* (2009.01)
- *G06F 21/62* (2013.01)

(52) U.S. Cl.
CPC ............ *H04L 63/10* (2013.01); *H04W 4/206* (2013.01); *H04W 4/21* (2018.02); *H04W 12/08* (2013.01); *G06F 2221/2149* (2013.01); *H04L 63/20* (2013.01)

(58) Field of Classification Search
USPC .................................................. 709/223, 225
See application file for complete search history.

(56) References Cited

U.S. PATENT DOCUMENTS

| | | | |
|---|---|---|---|
| 8,718,633 | B2 | 5/2014 | Sprigg et al. |
| 2004/0040034 | A1 | 2/2004 | Sullivan et al. |
| 2008/0163214 | A1* | 7/2008 | Rogers .................. G06Q 10/10 718/100 |
| 2008/0307339 | A1 | 12/2008 | Boro et al. |
| 2009/0254656 | A1 | 10/2009 | Vignisson et al. |
| 2010/0162342 | A1 | 6/2010 | Piepenbrink et al. |
| 2013/0254660 | A1 | 9/2013 | Fujioka |
| 2014/0195678 | A1 | 7/2014 | Longhorn |
| 2014/0207950 | A1* | 7/2014 | Badiee .................... H04L 43/08 709/224 |

OTHER PUBLICATIONS

Specification "Time and Task Based Validation to Enable or Disable Parental Controls" and drawings in related U.S. Appl. No. 15/877,954, filed Jan. 23, 2018, 57 pages.

* cited by examiner

TIME AND TASK BASED VALIDATION TO ENABLE OR DISABLE PARENTAL CONTROLS

FIELD OF THE INVENTION

The technical character of the present invention generally relates to parental controls, and more particularly, to systems and methods to enable or disable parental controls based on time or task validation using a centralized computing environment.

BACKGROUND

Many types of devices, such as mobile phones, tablet devices, and other computing, communication, and entertainment devices increasingly offer more functions, applications, and features which are beneficial to a user, and can enhance one's personal time as well as work and social activities. For example, not only can a mobile phone be used for text, email, and voice communications, but may also be used for entertainment, such as to listen to music, surf the Internet, watch video content, gaming, and for photo and video imaging. Similarly, a portable tablet device may be utilized for email, browser, navigation, and other computing applications, as well as for the various entertainment and photo features. In addition to the many computing, communication, and entertainment applications that are available to a user of a mobile phone or tablet device, a seemingly unlimited number of third-party applications and features are also available for download to a device It is common for families to be multitasking between tasks using these many types of devices such as entertainment (TV, gaming, mobile devices, etc.), school work (personal computing devices, mobile devices, etc.), and so on. Sometimes multitasking can divert concentration, take longer to complete work, or result in erroneous work output. As parents or guardians of children and teenagers, there is a desire to block time and distractions to allow children and teenagers to focus on completing homework or studying. For example, a parent wants their child or teenager to focus on solving mathematics and science homework when they come home from school rather than watching TV or playing video games. Accordingly, there is a desire for activities such as social networking, non-school work related websites, gaming related devices and applications, phone calls, text messaging, etc. to be restricted on one or more computing devices until homework is complete.

Traditionally, depending on the device type, some computing devices may provide for the ability to enable or disable parental controls. However, there are a couple of drawbacks with the traditional solutions. For example, each computing device must be configured individually with parental controls, which is time consuming. Further, the parental controls in existing solutions do not have a validation concept of task completion prior to usage. For these example parental control systems, they are largely based on configurable time restrictions that are not centrally managed across devices.

SUMMARY

In a first aspect of the invention, a method is implemented in a computer infrastructure having computer executable code tangibly embodied on a computer readable storage medium having programming instructions operable to: publish parental control rules to each of one or more computing devices to enable the parental control rules on each of the one or more computing devices, wherein at least one of the parental control rules includes at least one of: (i) a requirement that a task be completed prior to allowing use of one or more features or functions on the one or more computing devices, and (ii) a requirement that a current time be outside of a specified time period prior to allowing use of the one or more features or functions on the one or more computing devices; determine whether at least one of: (i) completion of the task is validated, and (ii) the current time is outside of the specified time period; and when at least one of: (i) the completion of the task is validated and (ii) the current time is outside of the specified time period, publish a parental control disable command to each of the one or more computing devices to disable the at least one of the parental control rules published to each of the one or more computing devices.

In another aspect of the invention, a computer program product is provided for disabling at least one parental control rule on a computing device. The computer program product comprises a computer readable storage medium having program instructions embodied therewith. The computer readable storage medium is not a transitory signal per se, and the program instructions are readable by the computing device to cause the computing device to perform a method comprising: enabling one or more parental control rules on the computing device, wherein at least one parental control rule of the enabled one or more parental control rules includes a requirement that a task be completed prior to allowing use of one or more blocked features or functions on the one or more computing devices; allowing use of one or more allowed features or functions on the computing device to complete the task; submitting the task to a task validation system to validate the task is completed; and when the task is completed and validated, receiving a parental control disable command and disabling the at least one parental control rule to allow use of the one or more blocked features or functions.

In yet another aspect of the invention, a system is provided for that includes a CPU, a computer readable memory and a computer readable storage medium. The system further includes program instructions to: receive parental control rules for one or more computing devices, wherein at least one of the parental control rules includes at least one of: (i) a requirement that a task be completed prior to allowing use of one or more features or functions on the one or more computing devices, and (ii) a requirement that a current time be outside of a specified time period prior to allowing use of the one or more features or functions on the one or more computing devices; publish the parental control rules to each of the one or more computing devices to enable the parental control rules on each of the one or more computing devices; program instructions to determine whether at least one of: (i) completion of the task is validated, and (ii) the current time is outside of the specified time period; program instructions to when at least one of: (i) the completion of the task is validated, and (ii) the current time is outside of the specified time period, publish a parental control disable command to each of the one or more computing devices to disable the at least one of the parental control rules published to each of the one or more computing devices. The program instructions are stored on the computer readable storage medium for execution by the CPU via the computer readable memory.

In a further aspect of the invention, a system comprises a CPU, a computer readable memory and a computer readable storage medium and program instructions to: publish parental control rules to each of one or more computing devices to enable the parental control rules on each of the one or more computing devices, wherein the parental control rules include a requirement that a task be completed prior to allowing use of one or more features or functions on the one or more computing devices; validate the completion of the task; and upon validating, provide a parental control disable command to each of the one or more computing devices to allow access to the one or more features or functions on the one or more computing devices.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
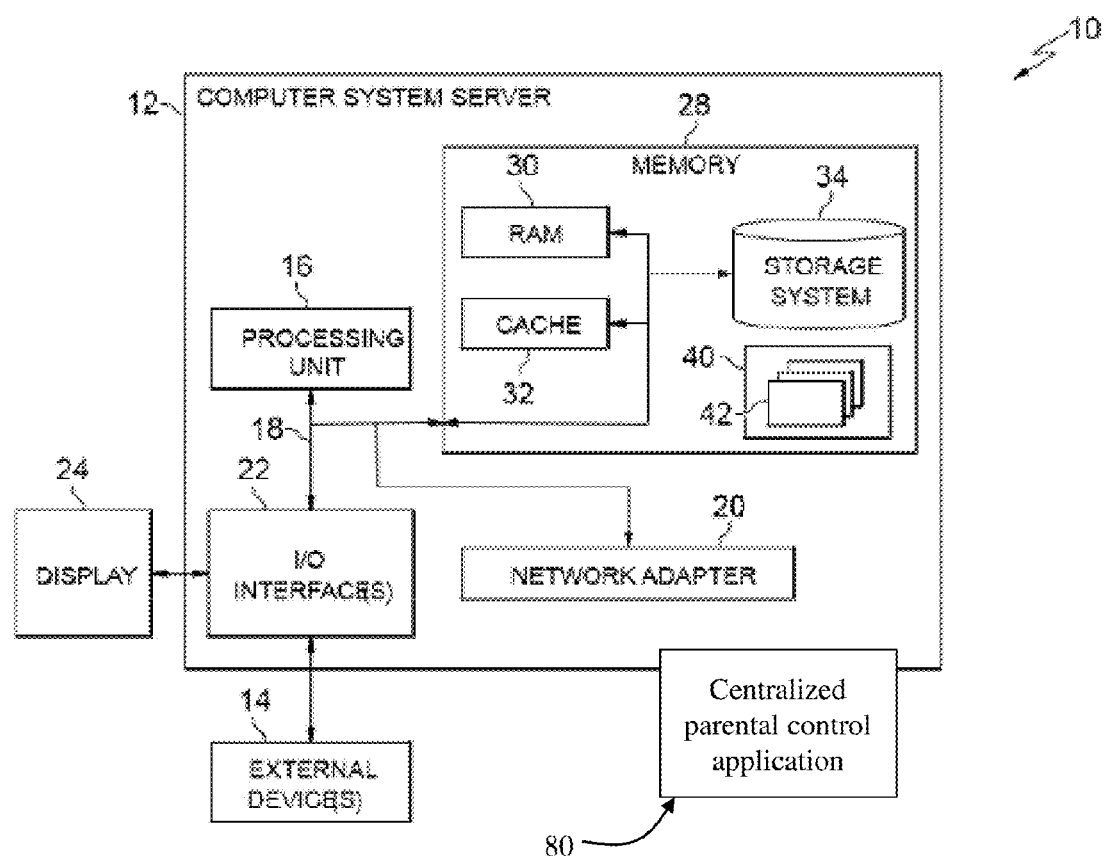
FIG. 1 depicts a cloud computing node according to an embodiment of the present invention.

The technical character of the present invention generally relates to parental controls, and more particularly, to systems and methods to enable or disable parental controls based on time or task validation using a centralized computing environment. More specifically, the present invention provides systems and methods that implement technical features such as a centralized parental control system (e.g., a cloud based centralized management of parental controls) and a time or task based validation application server and application that interoperate to allow users (e.g., parents or guardians) to implement parental control rules to validate that another user's (e.g., their child's or teenager's) tasks such as homework are completed prior to automatic activation of device usage (e.g., mobile phone, TV, unrestricted computer Internet usage, etc.) for entertainment. In embodiments, the systems and methods are configured to centrally manage and define parental control rules for one or more devices including the authorization or restriction of one or more multitasking activities on the one or more devices based on time or task validation. The systems and methods are also configured to centrally disable or enable the parental control rules such that the one or more multitasking activities are authorized or restricted on the one or more devices based on the time or task validation. Consequently, the systems and methods of the present invention provide an automated business rule based system to enable or disable parental controls using a centralized computing environment.

In embodiments, the systems and methods may also be configured to validate the time or task before authorizing the one or more multitasking activities on the one or more devices. For example, the parent or guardian may define the parental control rules for users and devices during specified time periods or based on the completion of various tasks or assignments. The parent control rules may be published from the centralized validation application server to the standards based parental control application on the devices being managed. Thereafter, the one or more multitasking activities are authorized or restricted on the one or more devices based on the specified time periods or depending on the completion of various tasks or assignments. The expiration of the specified time period is validated using a temporal device such as an internal clock on the one or more devices, and the completion of the various tasks or assignments may be validated using any number of methods including an electronic quiz, submission of work product, manual validation, etc.

The advantage of the aforementioned technical solution for centrally managing and implementing parental controls is that it will eliminate the technical problems of having to manually configure each device with the parental controls and the inability to validate that a task has been completed prior to usage of the device for one or more multitasking activities. For example, implementations of the present invention provide a technical contribution over conventional parental control systems and methods because the technical features of the present invention interoperate to enable or disable parental controls based on time or task validation using a centralized computing environment to improve the concentration level of users (e.g., children and teenagers) without taking away the ability of the users to use the devices for purposes of school work. The present invention is particularly of relevance to balancing work and entertainment time of children and teenagers, and more broadly, to balancing "screen time" of children and teenagers, and thus allowing children and teenagers to be empowered to complete tasks and have the one or more devices automatically enabled for entertainment purposes.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. FIG. 1 can also represent a computing infrastructure capable of performing and/or implementing tasks and/or functions of the methods described herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. In embodiments, the computer system/server 12 comprises or communicates with a centralized parental control application 80 as described in greater detail herein.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. For example, some or all of the functions of a centralized parental control application 80 can be implemented as one or more of the program modules 42. Additionally, the centralized parental control application 80 may be implemented as separate dedicated processors or a single or several processors to provide the functionality described herein. In embodiments, the centralized parental control application 80 performs one or more of the processes described herein, including but not limited to: managing accounts of users, centrally managing parental control rules for one or more devices, and publishing the parental control rules to the one or more devices.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
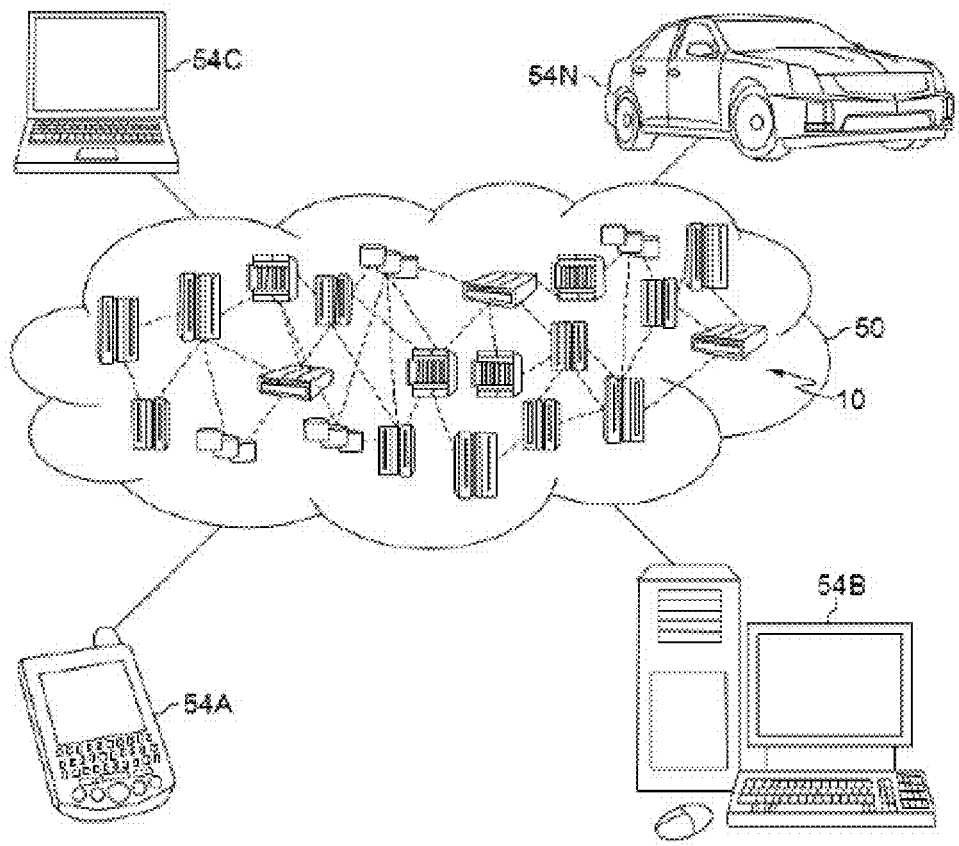
FIG. 2 depicts a cloud computing environment according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
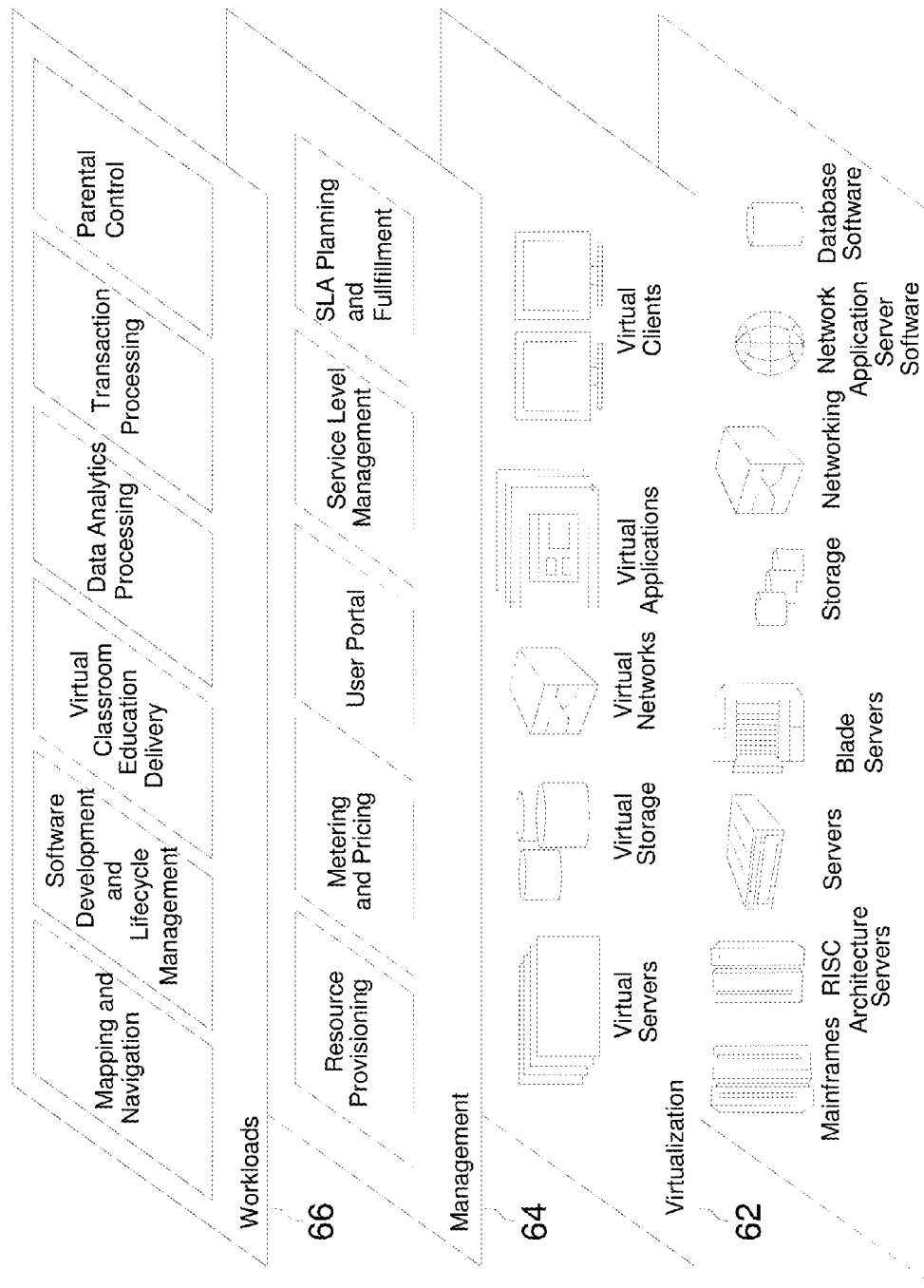
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and centralized parental control. In accordance with aspects of the invention, the centralized parental control workload/function operates to perform one or more of the processes described herein, including but not limited to provide a parental control based on whether a time has elapsed or a certain task has been performed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
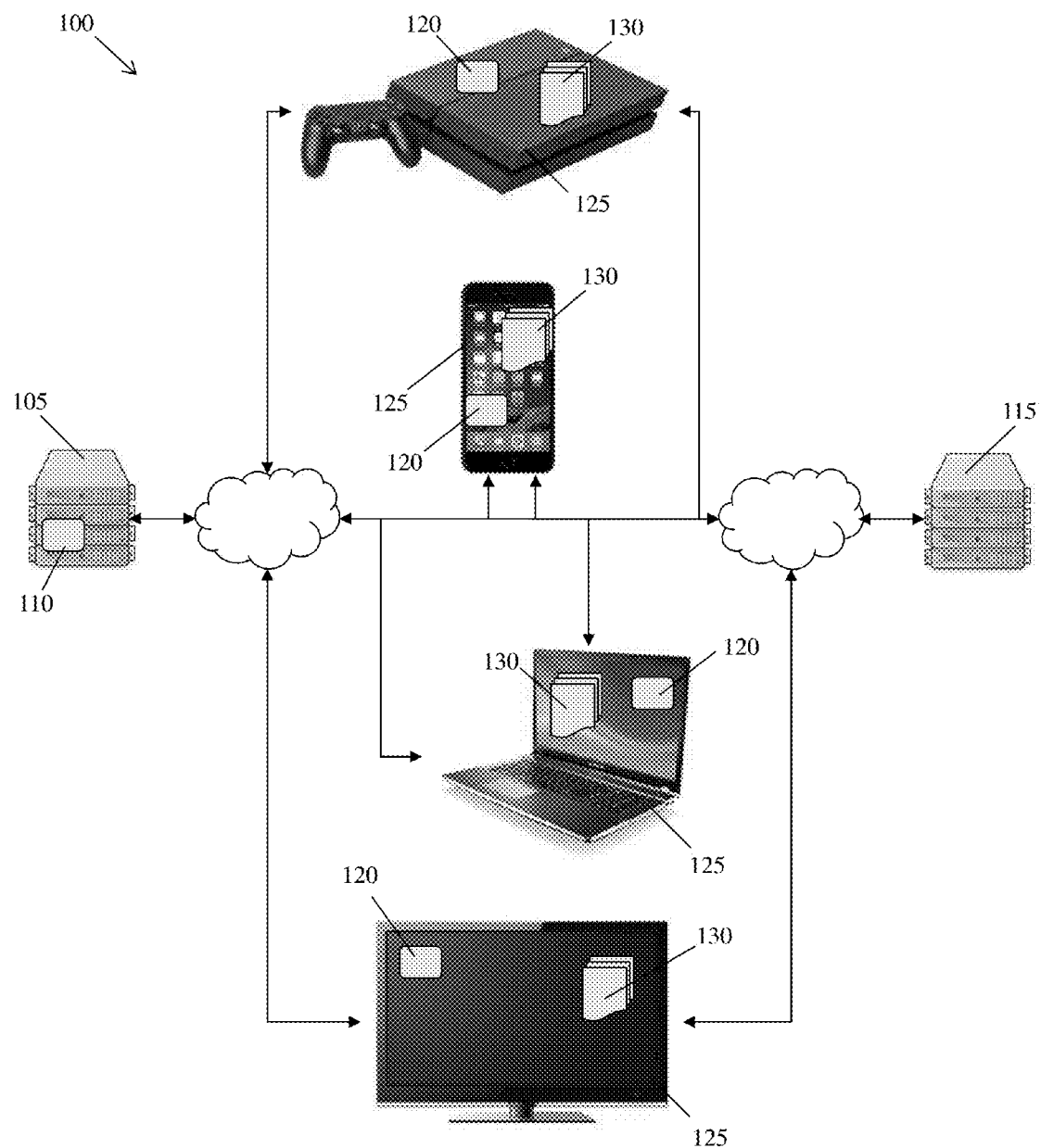
FIG. 4 shows a high level architecture for implementing processes in accordance with aspects of the present invention.

FIG. 4 is a high level architecture for implementing processes in accordance with aspects of the present invention. In embodiments, a computing system 100 includes a centralized parental control system 105 comprising a centralized parental control application 110 installed thereon, a task based validation application server 115, and a standards based parent control application 120 installed on each of the one or more computing devices 125 that interoperate to allow users to implement parental control rules to validate that another user's tasks such as homework are completed prior to automatic activation of one or more additional applications 130 on the one or more computing devices 125. In embodiments, the centralized parental control system 105 can be implemented as a cloud based centralized management system such as cloud computing node 10 discussed with respect to FIG. 1. In other embodiments, the centralized parental control system 105 can be implemented on a local computing device such as a home WiFi router. In embodiments in which the centralized parental control system 105 is implemented as a cloud based centralized management system, the standards based parent control application 120 installed on each of the one or more computing devices 125 would require wide area network (WAN) connectivity such as the Internet. In other embodiments in which the centralized parental control system 105 is implemented as a local WiFi, the standards based parent control application 120 installed on each of the one or more computing devices 125 would only require local area network (LAN) connectivity such as local WiFi.

The centralized parental control application 110 (e.g., centralized parental control application 80 discussed with respect to FIG. 1) is installed as a rules based web application in the centralized parental control system 105 and is configured to provide for centralized management of the one or more computing devices 125. The centralized parental control application 110 is accessible by standard web protocols (http/https) from a web browser client or custom application using http/https protocols. Additionally, communication from the centralized parental control application 110 to manage the one or more computing devices 125 may be performed using a standardized protocol (e.g., Common Management Information Protocol (CMIP) defined by open systems interconnection (OSI)). The centralized parental control application 110 is also configured to allow for entry point time or task based parental control rules and integration through events/message to initiate the parental control rules being enabled/disable.

The task based validation application server 115 is any computing device configured to validate that a task has been completed. When the task is completed and verified, the task based validation application server 115 may be further configured to send or trigger a message (e.g., a message within an email) being sent to a user that they have completed the task successfully or unsuccessfully. There may be any number (e.g., 1-n) of task based validation application servers 115. In embodiments, the task based validation application server 115 may be an extension of a school system application used by teachers and students. For example, each school system could have a separate system to allow students to electronically submit and validate homework. In additional or alternative embodiments, a third party such as a service provider could provide this service for the user and/or for school systems.

As should be understood by those of ordinary skill in the art, many school systems already have the ability for students to have online accounts to obtain class grades, obtain homework assignments, check class schedules and calendars, and submit homework. Aspects of the present invention are configured to leverage these systems to obtain validation that tasks are completed such that parental controls on the one or more computing devices 125 may be enabled or disabled accordingly. Some types of assignments are better suited than others for electronic submission and validation. Depending on the type of assignment, there may be implemented different types of validation. For purposes of illustration, a requirement to provide answers to questions in an electronic quiz can be implemented via the task based validation application server 115 to validate that a task has been completed. If a homework assignment is related to reading a chapter for history, science, etc. then implementing an electronic quiz where the student has to select from multiple choice questions pertaining to the reading material could be used to provide validation of completion of the reading task. Additionally, a requirement for submission of an assignment can be implemented via the task based validation application server 115 to validate that a task has been completed.

If a homework assignment is a paper that has been defined to be 3-5 pages, entered in a specific document type, and submitted to the school system web site, then implementing a submission check system that checks the homework document is submitted to the school system web site, verifies the document extension as the specific document type, and queries the content page length to verify the submitted document is 3-5 pages could be used to provide validation of completion of the paper task. Moreover, a requirement for manual validation by a user or third party can be implemented via the task based validation application server 115 to validate that a task has been completed. If a project needs to be completed, then implementing a manual check (e.g., a manual check via a parent or teacher) of the completeness of the project and electronic verification (e.g., electronic validation by the parent or teacher that the project is completed) could be used to provide validation of completion of the project.

The standards based parent control application 120 is installed on each of the one or more computing devices 125 and is configured to provide parental controls on each of the one or more computing devices 125, which can be managed centrally. In embodiments, each of the one or more computing devices 125 is network accessible such that the centralized parental control application 110 can manage the parental controls on each of the one or more computing devices 125 via the standards based parent control application 120. Specifically, in addition to the parental controls on each of the one or more computing devices 125, each of the one or more computing devices 125 includes an agent that adopts the network management protocol CMIP that allows the centralized parental control application 110 to manage the parental controls on each of the one or more computing devices 125.

In embodiments, the standards based parent control application 120 includes the following functions or features: (i) identify each of the one or more devices 125 by name or internet protocol (IP) address, register each of the one or more computing devices 125 with the centralized parental control application 110, apply centralized parental controls to each of the one or more computing devices 125, enable/ disable the parental controls on each of the one or more computing devices 125, time based parental controls to restrict access during specified time periods, task based parent controls to receive messages or events that tasks have been completed to enable use of the one or more additional applications 130, and allow users to define specific uses (e.g., use of a laptop web browser to access websites on the Internet to complete a homework task) of the one or more computing devices 125 during parental control time periods. In additional embodiments, the standards based parent control application 120 further includes an authentication requirement feature whereby a user of each of the one or more computing devices 125 needs to identify themselves such that proper parental controls can be applied to each of the one or more computing devices 125.

In embodiments, the one or more computing devices 125 may be similar to the local computing devices 54A-N depicted in FIG. 2. It is understood that the types of one or more computing devices 125 shown in FIG. 4 are intended to be illustrative only and that the centralized parental control system 105 and the task based validation application server 115 can communicate with any type of computerized device over any type of network and/or network addressable connection (e.g., using a web browser).

Figure 5:
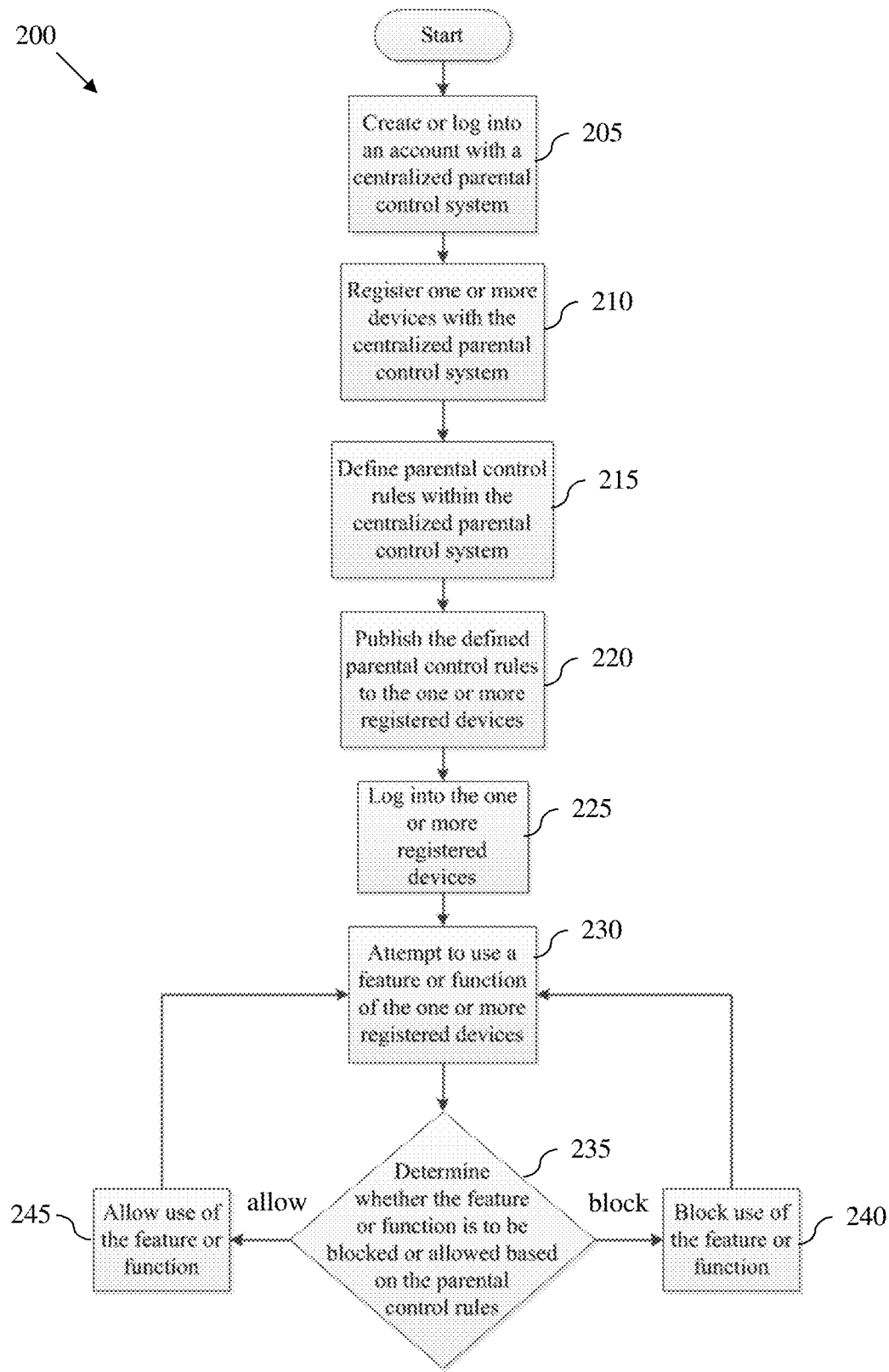
FIGS. 5-7 show exemplary flows in accordance with aspects of the present invention.
Figure 6:
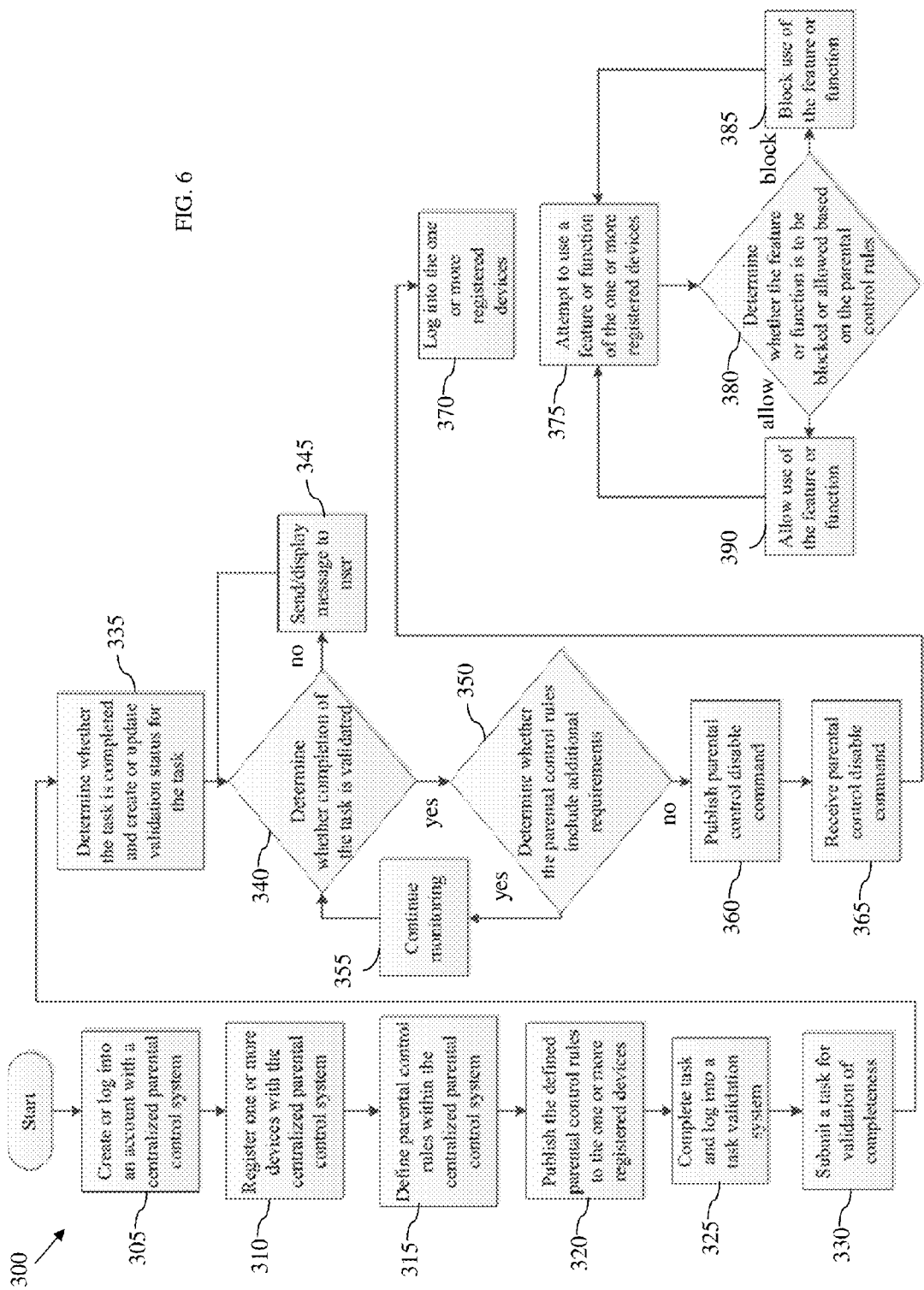
Figure 7:
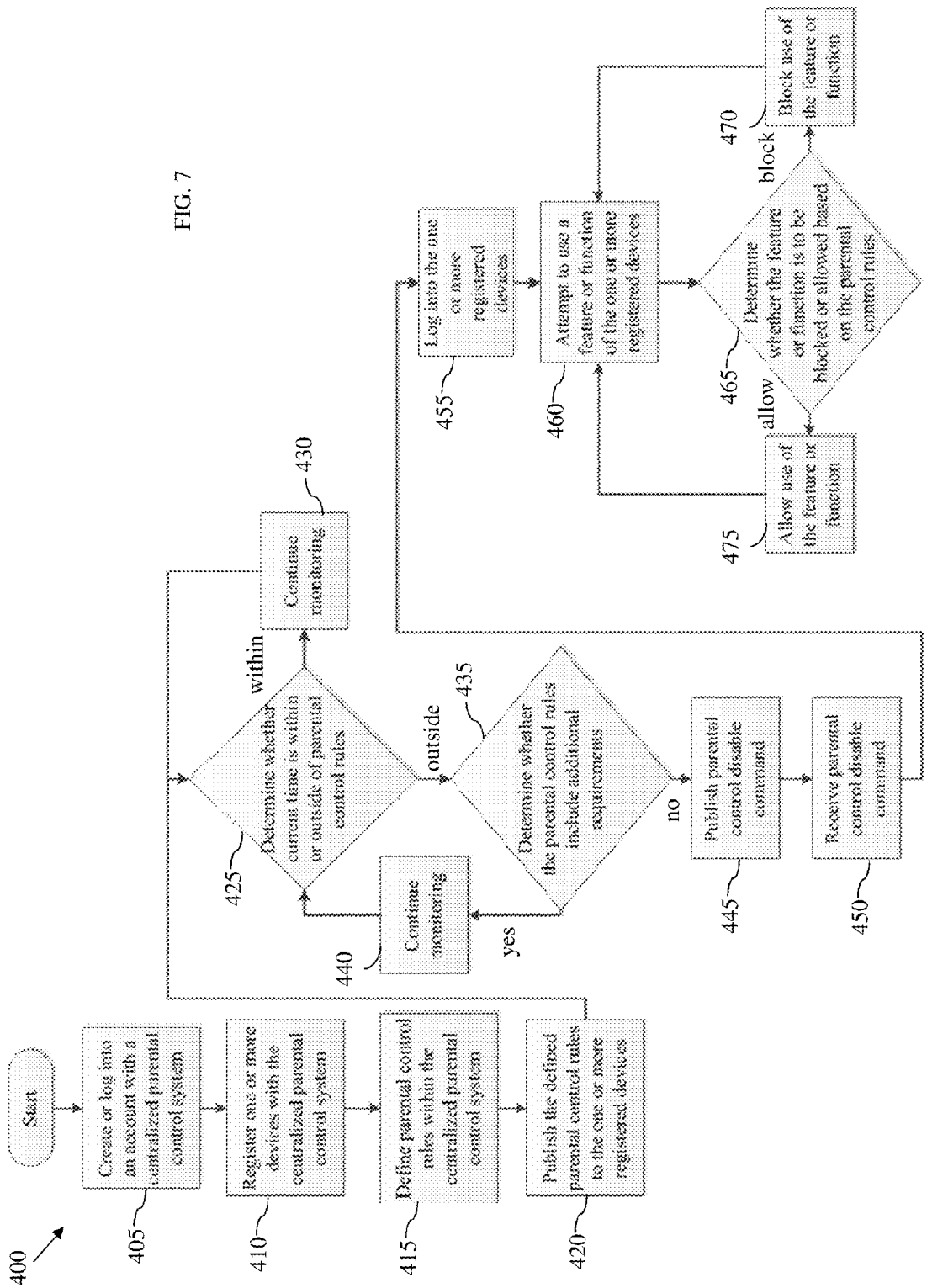

FIGS. 5-7 show exemplary flows for performing aspects of the present invention. The steps of FIGS. 5-7 may be implemented in the environment of FIGS. 1 and 2, for example. As noted above, the flowchart(s) illustrate the architecture, functionality, and operation of possible implementations of systems, methods, and computer program products as already described herein in accordance with the various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 5 is a flow diagram illustrating a process 200 for centralized management of parental controls in accordance with aspects of the present invention. At step 205, a user may create an account or log into an existing account on a centralized parental control system. For example, a user (e.g., a parent or guardian) may login to a Web interface of a centralized parental control system (e.g., centralized parental control system 105 discussed with respect to FIG. 4 of centralized parental control system 80 discussed with respect to FIG. 1) to create an account or log into an existing account on a centralized parental control application (e.g., centralized parental control application 110 discussed with respect to FIG. 4) from a standard Web browser using http/https protocol.

At step 210, a user may register one or more computing devices with the centralized parental control system using their account. For example, a user (e.g., parent or guardian) may use the Web interface of the centralized parental control system (e.g., centralized parental control system 105 discussed with respect to FIG. 4) to enter a hostname/url of application, and account credentials to register devices (e.g., the one or more computing devices 225 discussed with respect to FIG. 4 such as a mobile phone, smart TV, computer, game console, etc.) to centrally manage from a standard Web browser using http/https protocol. In embodiments, from the devices to be managed, the user would install a parental control application (e.g., the standards based parent control application 120 discussed with respect to FIG. 4) and configure the devices to communicate with the centralized parental control system. Thereafter, automated management of the devices may be performed by the centralized parental control system using network management protocol such as CMIP.

At step 215, a user may define parental control rules within the centralized parental control system to control multitasking activities. For example, a user (e.g., parent or guardian) may use the Web interface of the centralized parental control system (e.g., centralized parental control system 105 discussed with respect to FIG. 4) to define different time or task based parental control rules to control multitasking activities on the registered devices from a standard Web browser using http/https protocol. In embodiments, the parental control rules may include: (i) while studying online or offline subject A, all or specified possible multitasking activities (e.g., gaming applications and media streaming applications) will be blocked; (ii) while studying online or offline subject B, all or specified possible multitasking activities (e.g., gaming applications and media streaming applications) will be available across all devices; (iii) while studying online or offline subject C, no activities will be available on specified devices such as the television; and (iv) while studying online or offline subject D, specified activities will be available on specified devices such as outgoing phone calls from a cell phone.

At step 220, the defined parental control rules are published from the centralized parental control system to the devices. For example, the centralized parental control application 110 (e.g., centralized parental control application 110 discussed with respect to FIG. 4) will use the network management protocol to publish the defined parental control rules to the parental control application (e.g., the standards based parent control application 120 discussed with respect to FIG. 4) on each of the registered devices. In embodiments, the publishing the parental control rules to the devices causes the parental control rules to be enabled on the devices. In other embodiments, the parental control rules are enabled by the standards based parent control application (e.g., the standards based parent control application 120 discussed with respect to FIG. 4).

At step 225, a user may log into one or more of the registered devices. For example, a user (e.g., a child or teenager) may log into one or more of the registered devices via the parental control application (e.g., the standards based parent control application 120 discussed with respect to FIG. 4) installed on each of the registered devices. In embodiments, the parental control application includes an authentication requirement feature whereby a user of each of the devices needs to identify themselves such that proper parental controls can be applied to each of the devices. The usage of the devices by the user is now centrally managed via the parental controls published to each of the devices.

At step 230, when a user attempts to use a feature or function on one of the devices, the parental control application checks the parental control rules prior to allowing use of the feature or function. For example, when a user (e.g., a child or teenager) attempts to use a multitasking application such as a gaming application, the parental control application (e.g., the standards based parent control application 120 discussed with respect to FIG. 4) checks the parental control rules based on the identity of the user authenticated via the parental control application.

At step 235, the parental control application determines whether the use of the feature or function on the device is to be blocked or allowed based on the parental control rules. For example, when the parental control rules state that such a feature or function is to be blocked during a specific period of time or prior to a specific task being completed and the present time is within the specific period of time or validation of completion of the task has not been received, the parental control application (e.g., the standards based parent control application 120 discussed with respect to FIG. 4) blocks the use of the feature or function on the device. On the other hand, when the parental control rules state that such a feature or function is to be blocked during a specific period of time or prior to a specific task being completed and the present time is outside of the specific period of time or validation of completion of the task has been received, the parental control application (e.g., the standards based parent control application 120 discussed with respect to FIG. 4) allows the use of the feature or function on the device.

At step 240, when the parental control application determines the use of the feature or function on the device is to be blocked, the parental control application blocks the use of the feature or function on the device. In embodiments, when the feature or function is blocked, the user may receive an error message, and the error message may include details on the parental control rule being enforced such that the user can be informed as to what needs to be done (e.g., complete task A) to have the feature or function allowed on the device.

At step 245, when the parental control application determines the use of the feature or function on the device is to be allowed, the parental control application allows the use of the feature or function on the device. In embodiments, the parental control application will continually or periodically monitor use of the device and make determinations on blocking or allowing of additional features or functions attempted to be used by the user on the device and/or whether the current use of the device continues to comply with the parental control rules.

The advantage of the aforementioned computing system 100 and process 200 for centrally managing and implementing parental controls is that it will eliminate the technical problems of having to manually configure each device with the parental controls. For example, implementations of the present invention provide a technical contribution over conventional parental control systems and methods because the technical features of the present invention interoperate to configure parental controls at a central location and subsequently publish the parental controls to each registered device within a network. Each registered device is thereafter enabled to allow or block various usage of the devices based on the published parental controls.

FIG. 6 is a flow diagram illustrating a process 300 for task based validation in accordance with aspects of the present invention. At step 305, a user may create an account or log into an existing account on a centralized parental control system. At step 310, a user may register one or more computing devices with the centralized parental control system using their account. Steps 305 and 310 are performed in a similar manner as previously discussed with respect to steps 205 and 210 of FIG. 5, and thus the details of steps 305 and 310 will not be repeated.

At step 315, a user may define parental control rules within the centralized parental control system to control multitasking activities. For example, a user (e.g., parent or guardian) may use the Web interface of the centralized parental control system (e.g., centralized parental control system 105 discussed with respect to FIG. 4) to define different time or task based parental control rules to control multitasking activities on the registered devices from a standard Web browser using http/https protocol. In embodiments, the workflow for defining parental control may include adding one or more activities in sequence with AND/OR logic. For example, if a child completes Math, Science, and (Drawing or General Knowledge), then the child will be allowed to play a game for 30 minutes.

In additional embodiments, while creating parantal control logic, a user can also add aggregated activity completion logic. For example, in any week, if a child completes 15 Math problems with complexity 10, and 20 drawings, then the child is allowed to purchase entertainement online such as one online movie. In this case, weekly activity will be aggregated and accordingly the child can earn points for purchasing the online entertainment. A user (e.g., parent A) can also share any parental control rule(s) with other users (e.g., parent B), accordingly the other users can use the same predefined parentl control rules or customize the predefined parental controls rules to fit their own needs. Moreover, digital computing devices can create an impact on a user's eyes, thus users can utilize the parental control rules to control aggregated usage of multiple devices. For example, a user may define that only 2 hours of digital screen time is allowed per day (e.g., a tablet+TV is 2 hours a day). If the child uses 1 hour and 30 minutes on the tablet, then the child will be allowed to watch TV for only 30 minutes before the parental control blocks screen time on the tablet and TV.

At step 320, the defined parental control rules are published from the centralized parental control system to the devices. For example, the centralized parental control application 110 (e.g., centralized parental control application 110 discussed with respect to FIG. 4) will use the network management protocol to publish the defined parental control rules to the parental control application (e.g., the standards based parent control application 120 discussed with respect to FIG. 4) on each of the registered devices. In embodiments, the publishing the parental control rules to the devices causes the parental control rules to be enabled on the devices. In other embodiments, the parental control rules are enabled by the standards based parent control application (e.g., the standards based parent control application 120 discussed with respect to FIG. 4).

At step 325, a user may complete a task and log into a task validation system using a task validation application to validate completion of the task. For example, a user (e.g., a child or teenager) may log into a task validation system (e.g., a task based validation application server 115 as discuss with respect to FIG. 4) via a task validation application (e.g., a part of the standards based parent control application 120 discussed with respect to FIG. 4 or a separate third party application such a school based web page interface for submission of homework) installed on a computing device (e.g., one of the registered devices). In embodiments, the user may use one or more features on the one or more registered computing devices that are not disabled from the parental control rule to complete the task.

At step 330, the task is submitted to the task validation system via the task validation application for validation. For example, a user (e.g., a child or teenager) may perform any type of validation required for the completed task and submit the validation via the task validation application (e.g., a part of the standards based parent control application 120 discussed with respect to FIG. 4 or a separate third party application such a school based web page interface for submission of homework). In embodiments, the type of validation perfumed and submitted may include taking an electronic quiz pertaining to the task and submitting answers via the task validation application, uploading a homework assignment, requesting a manual check of completion of the task, etc.

At step 335, the task validation system determines whether the task is completed. Depending on the type of task performed, as noted above with respect to FIG. 4, different checks will be performed to validate the task is completed. For example, a requirement to provide answers to questions in an electronic quiz can be implemented via the task based validation application server to validate that a task has been completed. Additionally, a requirement for submission of an assignment can be implemented via the task based validation application server to validate that a task has been completed. Moreover, a requirement for manual validation by a user or third party can be implemented via the task based validation application server to validate that a task has been completed. In embodiments, the task validation system is further configured to create or update a validation status for the task based on the completeness determination. For example the validation status for a task could include not submitted (default status), submitted but validation failed (e.g., missing information, validation criteria failed, etc.), and submitted and validation approved.

At step 340, the centralized parental control system determines whether completion of a task has been validated. For example, the centralized parental control system (e.g., the centralized parental control system 105 as discussed with respect to FIG. 4) may be configured to subscribe to a messaging system with the task validation system (e.g., a task based validation application server 115 as discuss with respect to FIG. 4) to receive a status of the task validation. In this instance, the task validation system would publish messages including the validation status to a messaging system queue/topic. In embodiments, the validation status for a given user and task could have different states including not submitted, submitted but validation failed (e.g., missing information, validation criteria failed, etc.), and submitted and validation approved. In accordance with this aspect of the present invention, the centralized parental control system would be a consumer application to messages for the messaging system queue/topic and would check the status of the task for a given user/assignment for task validation.

In additional or alternative embodiments, the centralized parental control system (e.g., the centralized parental control system 105 as discussed with respect to FIG. 4) may be configured to perform a service request to check on the status of the task validation. For example, when the task validation is completed, the status of the task validation would be defined within the task validation system. The centralized parental control system can be configured to perform a service request with the task validation system to check the status of the task validation. There are a number of ways the service request could be initiated. For example, the service request could be initiated on a timed interval (e.g., every 5 minutes check status), or an initial parent control check of task validation status by some other means (student, parent, etc.).

At step 345, when validation has failed, the centralized parental control system sends an alert or message to the user of the registered device that the validation has failed. For example, the centralized parental control system (e.g., the centralized parental control system 105 as discussed with respect to FIG. 4) may be configured to send and/or display a message (e.g., an email message) to a user of the registered device that submitted the task for completion validation when validation has failed. The message would indicate the validation failed, and optionally, details on the reason(s) the validation failed, e.g., page count of assignment was below or above specified range for the assignment.

At step 350, when validation has been approved, the centralized parental control system performs a check of the parental control rules to determine whether any additional requirements or task(s) must be completed and validated prior to disabling the parental control rules. For example, the centralized parental control system (e.g., the centralized parental control system 105 as discussed with respect to FIG. 4) may be configured to check all parental control rules set up for a particular user to determine whether any additional task(s) must be completed and validated prior to disabling the parental control rules.

At step 355, when there are additional task(s) that must be completed and validated prior to disabling the parental controls, the centralized parental control system will continue to monitor the status of task validations as discussed in step 340. In embodiments, the centralized parental control system (e.g., the centralized parental control system 105 as discussed with respect to FIG. 4) may be further configured to send and/or display a message (e.g., an email) to a user of the registered device that additional task(s) still need to be completed and validated prior to the disabling of the parental control rules on a specified device.

At step 360, when there are no additional task(s) that must be completed and validated, a parental control disable command is published from the centralized parental control system to the registered devices. For example, the centralized parental control application 110 (e.g., centralized parental control application 110 discussed with respect to FIG. 4) will use the network management protocol to publish the parental control disable command to the parental control application (e.g., the standards based parent control application 120 discussed with respect to FIG. 4) on each of the registered devices.

At step 365, the parental control application on each registered device receives the parental control disable command and disables the parental control rules on each registered device for the given user. For example, the parental control application (e.g., the standards based parent control application 120 discussed with respect to FIG. 4) on each of the registered devices receives the published parental control disable command and disables the parental control rules on each device for the given user based on the command.

At step 370, a user may log into one or more of the registered devices. For example, a user (e.g., a child or teenager) may log into one or more of the registered devices via the parental control application (e.g., the standards based parent control application 120 discussed with respect to FIG. 4) installed on each of the registered devices. In embodiments, the parental control application includes an authentication requirement feature whereby a user of each of the devices needs to identify themselves such that proper parental controls can be applied to each of the devices. The usage of the devices by the user is now centrally managed via the parental controls published to each of the devices.

At step 375, when a user attempts to use a feature or function on one of the devices, the parental control application checks the parental control rules prior to allowing use of the feature or function. For example, when a user (e.g., a child or teenager) attempts to use a multitasking application such as a gaming application, the parental control application (e.g., the standards based parent control application 120 discussed with respect to FIG. 4) checks the parental control rules based on the identity of the user authenticated via the parental control application.

At step 380, the parental control application determines whether the use of the feature or function on the device is to be blocked or allowed based on the parental control rules. For example, when the parental control rules state that such a feature or function is to be blocked prior to a specific task(s) being completed and the parental control rules have not been disabled, the parental control application (e.g., the standards based parent control application 120 discussed with respect to FIG. 4) blocks the use of the feature or function on the device. On the other hand, when the parental control rules state that such a feature or function is to be blocked prior to a specific task being completed and the parental control rules have been disabled, the parental control application (e.g., the standards based parent control application 120 discussed with respect to FIG. 4) allows the use of the feature or function on the device.

At step 385, when the parental control application determines the use of the feature or function on the device is to be blocked, the parental control application blocks the use of the feature or function on the device. In embodiments, when the feature or function is blocked, the user may receive an error message, and the error message may include details on the parental control rule being enforced such that the user can be informed as to what needs to be done (e.g., complete task A) to have the feature or function allowed on the device.

At step 390, when the parental control application determines the use of the feature or function on the device is to be allowed, the parental control application allows the use of the feature or function on the device. In embodiments, the parental control application will continually or periodically monitor use of the device and make determinations on blocking or allowing of additional features or functions attempted to be used by the user on the device and/or whether the current use of the device continues to comply with the parental control rules.

FIG. 7 is a flow diagram illustrating a process 400 for time based validation in accordance with aspects of the present invention. At step 405, a user may create an account or log into an existing account on a centralized parental control system. At step 410, a user may register one or more computing devices with the centralized parental control system using their account. Steps 405 and 410 are performed in a similar manner as previously discussed with respect to steps 205 and 210 of FIG. 5, and thus the details of steps 405 and 410 will not be repeated.

At step 415, a user may define parental control rules within the centralized parental control system to control multitasking activities. For example, a user (e.g., parent or guardian) may use the Web interface of the centralized parental control system (e.g., centralized parental control system 105 discussed with respect to FIG. 4) to define different time or task based parental control rules to control multitasking activities on the registered devices from a standard Web browser using http/https protocol. In embodiments, the workflow for defining parental control may include adding one or more activities in sequence with AND/OR logic. For example, if a child completes Math, Science, and drawing or general knowledge, and the current time is not between 11 PM and 8 AM, then the child will be allowed to play a game for 30 minutes.

At step 420, the defined parental control rules are published from the centralized parental control system to the devices. For example, the centralized parental control application 110 (e.g., centralized parental control application 110 discussed with respect to FIG. 4) will use the network management protocol to publish the defined parental control rules to the parental control application (e.g., the standards based parent control application 120 discussed with respect to FIG. 4) on each of the registered devices. In embodiments, the publishing the parental control rules to the devices causes the parental control rules to be enabled on the devices. In other embodiments, the parental control rules are enabled by the standards based parent control application (e.g., the standards based parent control application 120 discussed with respect to FIG. 4).

At step 425, the centralized parental control system determines whether the current time is within or outside of the parental control rules. For example, the centralized parental control system (e.g., the centralized parental control system 105 as discussed with respect to FIG. 4) may be configured to compare the current time to each time requirement defined within each parental control rule.

At step 430, when the current time is within a time requirement of a parental control rule, the centralized parental control system continues to monitor the current time with respect to that parental control rule. At step 435, when the current time is outside of a time requirement of a parental control rule, the centralized parental control system performs a check of the parental control rules to determine whether any additional requirements must be completed prior to disabling the parental control rules. For example, the centralized parental control system (e.g., the centralized parental control system 105 as discussed with respect to FIG. 4) may be configured to check all parental control rules set up for a particular user to determine whether any additional task(s) must be completed and validated prior to disabling the parental control rules.

At step 440, when there are additional requirements that must be completed prior to disabling the parental controls, the centralized parental control system will continue to monitor the status of task validations as discussed in step 340 in FIG. 6 and the current time with respect to that parental control rule. In embodiments, the centralized parental control system (e.g., the centralized parental control system 105 as discussed with respect to FIG. 4) may be further configured to send and/or display a message (e.g., an email) to a user of the registered device that additional requirements still need to be completed prior to the disabling of the parental control rules on a specified device.

At step 445, when there are no additional requirements that must be completed prior to disabling the parental controls, a parental control disable command is published from the centralized parental control system to the registered devices. For example, the centralized parental control application 110 (e.g., centralized parental control application 110 discussed with respect to FIG. 4) will use the network management protocol to publish the parental control disable command to the parental control application (e.g., the standards based parent control application 120 discussed with respect to FIG. 4) on each of the registered devices.

At step 450, the parental control application on each registered device receives the parental control disable command and disables the parental control rules on each registered device for the given user. For example, the parental control application (e.g., the standards based parent control application 120 discussed with respect to FIG. 4) on each of the registered devices receives the published parental control disable command and disables the parental control rules on each device for the given user based on the command.

At step 455, a user may log into one or more of the registered devices. For example, a user (e.g., a child or teenager) may log into one or more of the registered devices via the parental control application (e.g., the standards based parent control application 120 discussed with respect to FIG. 4) installed on each of the registered devices. In embodiments, the parental control application includes an authentication requirement feature whereby a user of each of the devices needs to identify themselves such that proper parental controls can be applied to each of the devices. The usage of the devices by the user are now centrally managed via the parental controls published to each of the devices.

At step 460, when a user attempts to use a feature or function on one of the devices, the parental control application checks the parental control rules prior to allowing use of the feature or function. For example, when a user (e.g., a child or teenager) attempts to use a multitasking application such as a gaming application, the parental control application (e.g., the standards based parent control application 120 discussed with respect to FIG. 4) checks the parental control rules based on the identity of the user authenticated via the parental control application.

At step 465, the parental control application determines whether the use of the feature or function on the device is to be blocked or allowed based on the parental control rules. For example, when the parental control rules state that such a feature or function is to be blocked during a specified time period and the parental control rules have not been disabled, the parental control application (e.g., the standards based parent control application 120 discussed with respect to FIG. 4) blocks the use of the feature or function on the device. On the other hand, when the parental control rules state that such a feature or function is to be blocked during a specified time period and the parental control rules have been disabled, the parental control application (e.g., the standards based parent control application 120 discussed with respect to FIG. 4) allows the use of the feature or function on the device.

At step 470, when the parental control application determines the use of the feature or function on the device is to be blocked, the parental control application blocks the use of the feature or function on the device. In embodiments, when the feature or function is blocked, the user may receive an error message, and the error message may include details on the parental control rule being enforced such that the user can be informed as to what needs to be done (e.g., complete task A) to have the feature or function allowed on the device.

At step 475, when the parental control application determines the use of the feature or function on the device is to be allowed, the parental control application allows the use of the feature or function on the device. In embodiments, the parental control application will continually or periodically monitor use of the device and make determinations on blocking or allowing of additional features or functions attempted to be used by the user on the device and/or whether the current use of the device continues to comply with the parental control rules.

The advantage of the aforementioned computing system 100 and processes 300 and 400 for centrally managing and implementing parental controls is that it will eliminate the technical problems of having to manually configure each device with the parental controls and the inability to validate that a task has been completed prior to usage of the device for one or more multitasking activities. For example, implementations of the present invention provide a technical contribution over conventional parental control systems and methods because the technical features of the present invention interoperate to enable or disable parental controls based on time or task validation using a centralized computing environment to improve the concentration level of users (e.g., children and teenagers) without taking away the ability of the users to use the devices for purposes of school work.

As mentioned herein, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur in various combinations across the processes 200, 300, and 400 without departing from the spirit and scope of the present invention. For example, parental control rules defined by a user that include both time and task based requirements may implement processes across all three processes 200, 300, and 400.

In embodiments, the invention provides a method that performs the process of the invention on a subscription, advertising, and/or fee basis. That is, a service provider could offer to provide for centrally managing parental controls and/or validating completed tasks to enable or disable the parental controls. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for centrally managing parental controls and/or validating completed tasks to enable or disable the parental controls. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure having computer executable code tangibly embodied on a computer readable storage medium having programming instructions operable to:
publish parental control rules to each of one or more computing devices to enable the parental control rules on each of the one or more computing devices, wherein at least one of the parental control rules includes at least one of: (i) a requirement that a task be completed prior to allowing use of one or more features or functions on the one or more computing devices, and (ii) a requirement that a current time be outside of a specified time period prior to allowing use of the one or more features or functions on the one or more computing devices;
determine whether at least one of: (i) completion of the task is validated, and (ii) the current time is outside of the specified time period; and
when at least one of: (i) the completion of the task is validated and (ii) the current time is outside of the specified time period, publish a parental control disable command to each of the one or more computing devices to disable the at least one of the parental control rules published to each of the one or more computing devices,
wherein the validation of the completion of the task is performed automatically by a task based validation application server,
wherein, in response to the validation of the completion of the task by the task based validation application server, a validation status for the task is created or updated,
wherein the programming instructions are further operable to:
create an account for one or more users;
register the one or more computing devices with the account;
generate the parental control rules for the one or more computing devices based on input from the one or more users; and
send a message or alert to a user that submitted the task for validation of completion in response to the task being incomplete and not validated, the message or alert indicating a reason the validation of completion failed,
wherein the at least one of the parental control rules includes the requirement that the task be completed prior to allowing use of the one or more features or functions on the one or more computing devices,
wherein the determining whether the completion of the task is validated comprises: (i) subscribing to a messaging system to receive a status of task validation, or (ii) performing a service request to check on the status of the task validation, and
wherein the status of the task validation is the task has not been submitted for validation, the task is incomplete and not validated, or the task is complete and validated.

2. The method of claim 1, wherein the programming instructions are further operable to determine whether there are any additional time or task requirements that must be met prior to disabling the at least one of the parental control rules, when the task is complete and validated.

3. The method of claim 2, wherein the programming instructions are further operable to continue monitoring for at least one of: (i) completion of the at least one additional task requirement is validated, and (ii) the current time is outside of the at least one time requirement, when there is at least one additional time or task requirement.

4. The method of claim 1, wherein a service provider at least one of creates, maintains, deploys and supports the computer infrastructure.

5. The method of claim 1, wherein the task based validation application server is configured to perform the automatic validation of the completion of the task by receiving a submission of answers to quiz questions or a submission of work product.

6. A computer program product for disabling at least one parental control rule on a computing device, the computer program product comprising a computer readable storage medium having program instructions embodied therewith, wherein the computer readable storage medium is not a transitory signal per se, and the program instructions are readable by the computing device to cause the computing device to perform a method comprising:
enabling one or more parental control rules on the computing device, wherein at least one parental control rule of the enabled one or more parental control rules includes a requirement that a task be completed prior to allowing use of one or more blocked features or functions on the one or more computing devices;
allowing use of one or more allowed features or functions on the computing device to complete the task;
submitting the task to a task validation system to validate the task is completed; and
when the task is completed and validated, receiving a parental control disable command and disabling the at least one parental control rule to allow use of the one or more blocked features or functions,
wherein, in response to the submitting the task to the task validation system, task validation is performed automatically by a task based validation application server,
wherein, in response to the validation of the completion of the task by the task based validation application server, a validation status for the task is created or updated,
wherein when the task is incomplete or not validated, blocking use of the one or more blocked features or functions based on the at least one parental control rule,
wherein the task is a completion of an assignment, the at least one parental control rule is a completion of the assignment prior to use of the one or more blocked features or functions, and the one or more blocked features or functions are at least one of: watching television, playing a game, and listening to music,
wherein the submitting the task to the task validation system comprises uploading the assignment to the task validation system, and
wherein in response to the task being incomplete or not validated, a message or alert indicating a reason validation of completion failed is received.

7. A system comprising:
a CPU, a computer readable memory and a computer readable storage medium;
program instructions to receive parental control rules for one or more computing devices, wherein at least one of the parental control rules includes at least one of: (i) a requirement that a task be completed prior to allowing use of one or more features or functions on the one or more computing devices, and (ii) a requirement that a current time be outside of a specified time period prior to allowing use of the one or more features or functions on the one or more computing devices;

program instructions to publish the parental control rules to each of the one or more computing devices to enable the parental control rules on each of the one or more computing devices;

program instructions to determine whether at least one of: (i) completion of the task is validated, and (ii) the current time is outside of the specified time period;

program instructions to when at least one of: (i) the completion of the task is validated, and (ii) the current time is outside of the specified time period, publish a parental control disable command to each of the one or more computing devices to disable the at least one of the parental control rules published to each of the one or more computing devices, wherein the program instructions are stored on the computer readable storage medium for execution by the CPU via the computer readable memory, wherein the validation of the completion of the task is performed automatically by a task based validation application server, wherein, in response to the validation of the completion of the task by the task based validation application server, a validation status for the task is created or updated, further comprising program instructions to:
  create an account for one or more users;
  register the one or more computing devices with the account;
  generate the parental control rules for the one or more computing devices based on input from the one or more users; and
  send a message or alert to a user that submitted the task for validation of completion in response to the task being incomplete and not validated, the message or alert indicating a reason the validation of completion failed, wherein the at least one of the parental control rules includes the requirement that the task be completed prior to allowing use of the one or more features or functions on the one or more computing devices, wherein the determining whether the completion of the task is validated comprises: (i) subscribing to a messaging system to receive a status of task validation, or (ii) performing a service request to check on the status of the task validation, and wherein the status of the task validation is the task has not been submitted for validation, the task is incomplete and not validated, or the task is complete and validated.

8. The system of claim 7, further comprising program instructions to when the task is complete and validated, determine whether there are any additional time or task requirements that must be met prior to disabling the at least one of the parental control rules.

9. The system of claim 8, further comprising program instructions to when there is at least one additional time or task requirement, continue monitoring for at least one of: (i) completion of the at least one additional task requirement is validated, and (ii) the current time is outside of the at least one time requirement.

10. A system comprising:
  a CPU, a computer readable memory and a computer readable storage medium;
  programming instructions to publish parental control rules to each of one or more computing devices to enable the parental control rules on each of the one or more computing devices, wherein the parental control rules include a requirement that a task be completed prior to allowing use of one or more features or functions on the one or more computing devices;
  validate the completion of the task; and
  upon validating, provide a parental control disable command to each of the one or more computing devices to allow access to the one or more features or functions on the one or more computing devices, wherein the validation of the completion of the task is performed automatically by a task based validation application server, wherein, in response to the validation of the completion of the task by the task based validation application server, a validation status for the task is created or updated, further comprising programming instructions to:
  create an account for one or more users;
  register the one or more computing devices with the account;
  generate the parental control rules for the one or more computing devices based on input from the one or more users; and
  send a message or alert to a user that submitted the task for validation of completion in response to the task being incomplete and not validated, the message or alert indicating a reason the validation of completion failed, wherein the at least one of the parental control rules includes the requirement that the task be completed prior to allowing use of the one or more features or functions on the one or more computing devices, wherein the determining whether the completion of the task is validated comprises: (i) subscribing to a messaging system to receive a status of task validation, or (ii) performing a service request to check on the status of the task validation, and wherein the status of the task validation is the task has not been submitted for validation, the task is incomplete and not validated, or the task is complete and validated.

11. The system of claim 10, wherein the programming instructions are further operable to determine whether there are any additional time or task requirements that must be met prior to disabling the at least one of the parental control rules, when the task is complete and validated.

12. The system of claim 10, wherein the parental control rules further include a requirement that a current time be outside of a specified time period prior to allowing use of the one or more features or functions on the one or more computing devices.

13. The system of claim 12, wherein the programming instructions are further operable to monitor whether there has been the completion of the task requirement, and the current time is outside of the at least one time requirement, and, when so, provide a validation and disable the parental control.

* * * * *